United States Patent
Sitsky et al.

(10) Patent No.: US 11,516,245 B2
(45) Date of Patent: *Nov. 29, 2022

(54) SYSTEMS AND METHODS FOR PARALLELIZED CUSTOM DATA-PROCESSING AND SEARCH

(71) Applicant: Nuix Limited, Sydney (AU)

(72) Inventors: David Sitsky, Garran (AU); Edward Sheehy, Willoughby (AU)

(73) Assignee: Nuix Limited, Sydney (AU)

( * ) Notice: Subject to any disclaimer, the term of this patent is extended or adjusted under 35 U.S.C. 154(b) by 223 days.

This patent is subject to a terminal disclaimer.

(21) Appl. No.: 17/076,525

(22) Filed: Oct. 21, 2020

(65) Prior Publication Data

US 2021/0058425 A1 Feb. 25, 2021

Related U.S. Application Data

(63) Continuation of application No. 14/804,623, filed on Jul. 21, 2015, now Pat. No. 10,826,930.

(60) Provisional application No. 62/027,488, filed on Jul. 22, 2014.

(51) Int. Cl.
*G06F 21/00* (2013.01)
*H04L 9/40* (2022.01)
*G06F 21/56* (2013.01)

(52) U.S. Cl.
CPC .......... *H04L 63/1441* (2013.01); *G06F 21/56* (2013.01); *H04L 63/1416* (2013.01)

(58) Field of Classification Search
CPC . H04L 63/1441; H04L 63/1416; G06F 21/56; G06F 21/562; G06F 21/568
See application file for complete search history.

(56) References Cited

U.S. PATENT DOCUMENTS

| | | |
|---|---|---|
| 5,230,047 A | 7/1993 | Frey, Jr. et al. |
| 5,590,284 A | 12/1996 | Crosetto |
| 5,838,913 A | 11/1998 | Lysejko et al. |
| 5,963,944 A | 10/1999 | Adams |
| 5,987,468 A | 11/1999 | Singh et al. |
| 6,219,833 B1 | 4/2001 | Solomon et al. |
| 6,651,065 B2 | 11/2003 | Brown et al. |
| 6,993,763 B2 | 1/2006 | Hayes, Jr. |
| 7,162,620 B2 | 1/2007 | Magoshi |

(Continued)

FOREIGN PATENT DOCUMENTS

| | | |
|---|---|---|
| KR | 20030013619 A | 2/2003 |
| KR | 20050057834 A | 6/2005 |

(Continued)

OTHER PUBLICATIONS

International Search Report and Written Opinion dated Sep. 29, 2009 for International Application PCT/JS2009/033759 with international filing date Feb. 11, 2009 (8 pages).

*Primary Examiner* — Brandon Hoffman
*Assistant Examiner* — William A Corum, Jr.
(74) *Attorney, Agent, or Firm* — Nutter McClennen & Fish LLP (57) ABSTRACT

This invention provides systems and methods for data processing by means of an ongoing background process on an end-user's computer. As a user receives and generates data, files are analyzed. A container file is opened into the volatile memory and its contents (including data and metadata) are extracted, without requiring an index to be created. The extracted components are analyzed based on predefined characteristics.

20 Claims, 4 Drawing Sheets

(56) References Cited

U.S. PATENT DOCUMENTS

| | | |
|---|---|---|
| 7,263,536 B1 | 8/2007 | Pederson |
| 7,523,130 B1 | 4/2009 | Meadway et al. |
| 7,669,036 B2 | 2/2010 | Brown et al. |
| 7,672,790 B2 | 3/2010 | McGraw et al. |
| 7,730,113 B1 | 6/2010 | Payette et al. |
| 7,743,189 B2 | 6/2010 | Brown et al. |
| 7,751,805 B2 | 7/2010 | Neven et al. |
| 8,239,938 B2 | 8/2012 | Simeral et al. |
| 8,359,365 B2 | 1/2013 | Sitsky et al. |
| 8,370,845 B1 | 2/2013 | Le Grand |
| 8,396,838 B2 | 3/2013 | Brockway et al. |
| 8,407,190 B2 | 3/2013 | Prahlad et al. |
| 8,429,147 B1 | 4/2013 | Dutton et al. |
| 8,429,165 B1 | 4/2013 | Jung et al. |
| 8,491,384 B2 | 7/2013 | Tran et al. |
| 8,499,025 B2 | 7/2013 | Howard |
| 8,510,237 B2 | 8/2013 | Cascaval et al. |
| 8,510,492 B2 | 8/2013 | Martchovsky |
| 8,516,174 B2 | 8/2013 | Goerlich et al. |
| 8,527,972 B2 | 9/2013 | Shimura |
| 8,531,942 B2 | 9/2013 | Buttner et al. |
| 8,533,717 B2 | 9/2013 | Kilian et al. |
| 8,555,265 B2 | 10/2013 | Chambers et al. |
| 8,819,694 B2 | 8/2014 | Corona |
| 2002/0009079 A1 | 1/2002 | Jungck et al. |
| 2003/0101099 A1 | 5/2003 | Sheltz et al. |
| 2003/0167295 A1 | 9/2003 | Choo |
| 2003/0182355 A1 | 9/2003 | Edahiro et al. |
| 2003/0226108 A1 | 12/2003 | Oezgen |
| 2004/0003039 A1 | 1/2004 | Humphrey et al. |
| 2004/0015978 A1 | 1/2004 | Orii |
| 2004/0111552 A1 | 6/2004 | Arimilli et al. |
| 2007/0073894 A1 | 3/2007 | Erickson et al. |
| 2007/0112783 A1 | 5/2007 | McCreight et al. |
| 2008/0030764 A1 | 2/2008 | Zhu et al. |
| 2008/0059452 A1 | 3/2008 | Frank |
| 2008/0080718 A1 | 4/2008 | Meijer et al. |
| 2008/0082490 A1 | 4/2008 | MacLaurin et al. |
| 2008/0104609 A1 | 5/2008 | D'Amora et al. |
| 2008/0143707 A1 | 6/2008 | Mitchell |
| 2010/0162261 A1 | 6/2010 | Shashidhara |
| 2011/0047551 A1 | 2/2011 | Sitsky et al. |
| 2011/0219451 A1 | 9/2011 | McDougal et al. |
| 2011/0274329 A1 | 11/2011 | Mathew et al. |
| 2012/0089612 A1 | 4/2012 | Collins et al. |
| 2012/0233130 A1 | 9/2012 | Vedachalam et al. |
| 2012/0265762 A1 | 10/2012 | Wade et al. |
| 2012/0296891 A1 | 11/2012 | Rangan |
| 2013/0021238 A1 | 1/2013 | Laufgraben |
| 2013/0024424 A1 | 1/2013 | Prahlad et al. |
| 2013/0028106 A1 | 1/2013 | Frost |
| 2013/0060933 A1 | 3/2013 | Tung et al. |
| 2013/0114107 A1 | 5/2013 | Park |
| 2013/0127851 A1 | 5/2013 | Richards, Jr. |
| 2013/0132468 A1 | 5/2013 | Azeez et al. |
| 2013/0173499 A1 | 7/2013 | Cannon |
| 2013/0205018 A1 | 8/2013 | Rahman et al. |
| 2013/0212090 A1 | 8/2013 | Sperling et al. |
| 2013/0231912 A1 | 9/2013 | Ye et al. |
| 2013/0237200 A1 | 9/2013 | Nystrom et al. |
| 2013/0238572 A1 | 9/2013 | Prahlad et al. |
| 2013/0325873 A1 | 12/2013 | Sitsky et al. |
| 2014/0181056 A1 | 6/2014 | Pidduck |
| 2015/0095340 A1 | 4/2015 | Bishop |

FOREIGN PATENT DOCUMENTS

| | | |
|---|---|---|
| WO | 2003/079206 A1 | 9/2003 |
| WO | 2009/102765 A2 | 8/2009 |

SYSTEMS AND METHODS FOR PARALLELIZED CUSTOM DATA-PROCESSING AND SEARCH

CROSS-REFERENCE TO RELATED APPLICATIONS

This application is a continuation application which claims priority to U.S. non-provisional application Ser. No. 14/804,623, filed Jul. 21, 2015 and titled "Systems and Methods for Parallelized Custom Data-Processing and Search" and naming David Sitsky and Edward Sheehy as inventors, and also claims priority to U.S. Provisional Application 62/027,488, filed Jul. 22, 2014.

The contents of each of the foregoing are incorporated herein by reference, in their entirety.

FIELD OF THE INVENTION

The present disclosure generally relates to the field of electronic data processing, and more particularly, to processing structured, semi-structured, and unstructured data found in electronic containers.

BACKGROUND

Credit card fraud, identity theft, espionage, and embezzlement cause significant harm to people and businesses. Not only can bank accounts be drained by such bad acts, people's reputations can be ruined and business relationships can be compromised. Unfortunately, evidence of such wrongdoing is often hidden in a forest of electronic data. Companies store electronic data for many aspects of their business, including accounting, inventory, customer information, finances, and email communication. Countless emails are sent and received daily. Workers routinely generate new documents and store them on computers and servers. Paper documents are scanned and sent by email. Many pictures and flat files are converted into digital text by optical character recognition. In many industries, all facets of work product are stored electronically, often in highly unstructured formats. If data were structured according to some formal system, the exceptional events may be easy to spot. Unfortunately, unstructured data does not have a data model and is not organized in a predefined manner. Although businesses deal in great quantities of such data, they often do not have sufficiently robust data processing systems in place to easily process it. Many organizations avoid undertaking large data processing tasks, allowing cybersecurity threats to go undetected.

Prior attempts to address these problems have included indexing and scanning an organization's data store. Indexing requires the creation of another, extrinsic data structure which is costly, time-consuming, and requires extrinsic storage and resources. Scanning is severely limited in its ability to examine embedded content in a compound file. For example, scanning may detect certain words in an email, while failing to detect that an attached PDF is a bank statement.

SUMMARY

The invention provides systems and methods for rapidly processing or searching large volumes of electronically stored information by extracting components of compound files within the searching computer's short-term memory or rapidly accessible memory without creating or storing on disk an index of the content or metadata of said information. Systems of the invention can apply a blanket rule against all of the examined content or can examine the content and metadata of each component item while that item is held within memory, in the anticipation of undertaking resulting tasks based on the results of that examination. The system can use a load-balancing parallel processing strategy to process data stores or data containers, identifying specific characteristics contained in their content or associated metadata without creating an index. With systems of the invention, additional activities may take place based on the results of the search. Because the data process can operate as an ongoing process in the background to continually monitor a target such as a user's computer, evidence of wrongdoing or data points of interest can be detected immediately and automatically. There is no need for an expensive and cumbersome indexing project to retrospectively analyze stored data. Organizations can employ the data-processing methods to continually monitor their ever-growing forest of data. Since each twig in the forest is examined as it springs into life, wrong-doers never even get a chance to conduct undetected activity.

The system can be used to process structured data (i.e., databases, executables, .dll files etc.), semi-structured data (i.e., log files, event files etc.) and unstructured data (i.e. emails and other "human-generated" data which are often stored in containers) even where structured data and semi-structured data are contained within unstructured data containers and vice-versa (so definitions can be open to argument). The system can process data within electronic containers such as archives, email servers, Microsoft Outlook PST files, ZIP archive files, or other material that is stored on electronic storage media including storage area networks, network attached storage, hard drives and even random access memory (RAM), or other such proprietary formats and storage media that do not always lend themselves or their content to being easily searched.

Using systems of the invention, a search may be undertaken while an item is either in the short-term memory (i.e. RAM), temporary storage, or very rapidly accessible memory without having to create an index. A resulting action is undertaken based on the result of the search in an automated fashion without manual intervention or the need to create a persistent index. A "non-search example" of where this invention would play is to move all content of a complex container item to a different repository or container. Systems and methods of the invention may use a parallel processing framework to complete tasks considerably faster than typical prior-art single-threaded scanning technologies. Systems and methods of the invention are operable to examine all the embedded content within complex files such as PSTs and apply use heuristics to decide whether or not to scan each extracted item, or indeed apply a single rule against all of the content.

Moreover, unlike prior art approaches that treat scanning and indexing as an after-the-fact activity to be conducted in a discrete session, systems and methods may operate as an ongoing background process for examining a target such as end-user's computer. The invention may be deployed via an application programming interface (API) that uses parallel processing to analyze data while the data is stored in a volatile memory, such as random-access memory (RAM) or temporary storage. As a user receives and generates data, files are analyzed. A container file is opened into the volatile memory and its contents (including data and metadata) are extracted, without requiring an index to be created. The extracted components are analyzed based on predefined characteristics. The type of analysis performed on the data can be predefined by the user. The user inputs a processing callback or executable code, which causes the invention to return certain information it has processed, such as an item's metadata, family information, text or binary. The action that is undertaken is automated and does not require intermediate manual intervention. A heuristic rule can be applied to decide whether to scan each extracted item or whether to apply a single rule against all of the content.

The described load-balancing parallel processing strategy allows the invention to be particularly useful for processing complex and compound data formats. If after opening a first container file, another container file is found therein, that file is opened by a parallel process, and its contents extracted as well. The second process independently makes a load-balancing decision based on finding a container within the container. Files are opened and extracted in this manner recursively until all components have been analyzed. This technique allows complex files to be thoroughly analyzed without requiring the additional time, resources, and cost of creating a persistent index.

The invention uses heuristics to decide whether or not to search each individual component of a container while in a temporary memory. This avoids some of the shortcomings of current scanning technologies that are either over-inclusive or under-inclusive. Scanning technology must either handle a compound file as a single item or expand all of its components to a memory and analyze each individually. The present disclosure is both more efficient and more precise than common scanning technologies. It can apply a heuristic rule to determine whether or not to search each item, and thereby deliver more accurate answers to specific search queries.

After a file is searched, the invention can perform a user-defined action on the data. Because the action is defined by the user, the invention is highly customizable for different business purposes. The action can be a simple or sophisticated search, or it can be some other means of manipulating data such as moving a file, extracting certain data, saving a file, deleting a file, and the like. The invention allows the user to take advantage of the capabilities of parallel processing without having to understand the complexities of parallelism.

There are many potential uses for the invention. For example, it can be used as a privacy safeguard, by locating and identifying data that contains confidential information, and then moving that data to a secure location or applying a security feature. This could be used to protect customer information, company financial information, employee information, and the like. It also is valuable as a records management tool. It can examine entered data and classify it based on its content. The data can then be moved to an appropriate location. This ensures that the content of files is properly understood and correctly stored. Searching and recalling becomes easier and more efficient when data is stored in the right place.

The invention can help with gathering information for a particular purpose, such as a freedom of information request. Data can be filtered by keyword, author, date, or other variables. The data can be automatically sorted while in a volatile memory and positive results can optionally be indexed for future interrogation. The invention can be useful for e-discovery requests as well by sorting between responsive and non-responsive data based on user-defined criteria.

Cybersecurity is another area where the invention is particularly useful. It can search for file types that are known to be associated with security breaches, and it can respond by notifying a user, quarantining the file, or deleting the file. It may flag an executable file or a .dll file received in an email, and identify it based on a digital signature. It can then analyze whether or not the file is a threat, and search for other similar files. It can also compare URLs found in emails or stored on disk with known phishing and malware URLs to identify a potential breach. If a file or URL is identified as a threat, it can be contained or removed.

Another advantage of the invention is that it can operate alongside an organization's current technology. Many organizations have implemented complex database structures that are specific to their products and services. The present invention can process data within an existing database structure and return results in real time.

In certain aspects, the invention provides a method for processing data by opening an archive file into a volatile (e.g., RAM or temporary storage deleted after search or action) memory, extracting—using a first process—a first computer file from the archive file without indexing the entire archive file, and determining—using the first process—that the first computer file has a second computer file stored therein. The first process causes a second process to extract the second computer file. The second process extracts the second computer file, determines that the second computer file satisfies a criterion, and performs an operation on the second computer file. The computer files may include content and metadata. Each process may be on a separate processor, a separate core, or on the same processor or core. The criterion could be, for example, that the file contains a third computer file therein, is of a particular file format, contains certain data, contains certain metadata, contains a URL known to be associated with phishing or malware, contains certain keywords, contains certain dates, or is written by a certain author. The operation could include, for example, applying a heuristic rule to the file, analyzing content of the extracted file, searching the file, saving the file to a non-volatile memory, moving the file to a different location, extracting certain data from the file, extracting certain metadata from the file, adding the file to a list, sending an alert, or deleting the file. Preferably, the method is performed by a system comprising one or more processors, the system configured to perform the method as a background process, which runs continually after receiving an initial input from a user.

Related aspects provide a system for processing data. The system includes at least one processor coupled to a volatile memory (which may be, for example, RAM or temporary storage) and is operable to open an archive file into the volatile memory, extract—using a first process—a first computer file from the archive file without indexing the entire archive file, determine that the first computer file has a second computer file stored therein, and cause a second process to extract the second computer file. The second process extracts the second computer file, determines that the second computer file satisfies a criterion, and performs an operation on the second computer file.

DETAILED DESCRIPTION

The present disclosure generally relates to the field of electronic data processing, and more particularly, to processing computer files stored in a volatile memory. While most traditional data processing systems rely on indexing the data, the present invention avoids the need to index by analyzing data while the data is in a temporary memory and applying heuristics to determine whether to analyze all data in a container or apply a blanket rule. The disclosed application programming interface (API) uses parallel processes to further streamline data analysis. More specifically, this invention opens a container file or compound file into a volatile memory location such as a random-access memory or temporary storage. If a second file is embedded therein, the second file is extracted and a second process is initiated that opens that file. This occurs recursively until all files in a compound file are extracted and analyzed. The invention applies a predetermined user-defined rule to determine whether to perform an action on the data found therein. It uses heuristics to determine whether to analyze each piece of data or to apply a rule to all data in a file. Heuristics are techniques for solving a problem more quickly or finding an approximate solution when an exact solution is not required. Applying these shortcuts increases the processing speed, while decreasing accuracy or precision when they are not needed.

The invention includes the ability to conduct ongoing data processing as a background process on an end-user's computer. In certain embodiments, systems and methods of the invention are implemented to continuously process data as the data is received or created on an end-user's computer, including processing data down to the level of metadata of documents, files, objects, or attachments. The invention allows data to be processed as it is received and as it is generated, thereby obviating the need to conduct later searches that require large amounts of time and resources.

The invention processes data while it is stored in a volatile memory. A volatile memory, or a temporary memory, is a computer memory that requires power to store data. As opposed to a hard drive, a volatile memory immediately loses its contents on power down. A common example of a volatile memory is a random-access memory (RAM).

A user can use systems and methods of the invention as a tool for records management, privacy, cybersecurity thread detection, cybersecurity incident response, freedom of information requests, or other such jobs. The user simply writes a single processing "callback" which invokes the system to process an item and return information such as the item's metadata, family information, text and/or binary when the item has been successfully processed. These callbacks may be executed in parallel for maximum efficiency. For each item processed, the system:
1. Opens the container file into the computer's short-term memory or rapidly accessible temporary memory/storage
2. Extracts its individual components and, if required, their sub-components recursively until all individual components have been extracted
3. Optionally conducts simple and sophisticated searches while the data is in temporary memory/storage
4. Optionally takes user-defined actions on all the content or based on the results of those searches.

Systems may be implemented as a parallelized custom data-processing and search application programming interface (API) or similar tool. Such a tool may include configuration options to increase efficiency whereby the callback only provides certain information if required. For example, it can be configured only to return, for example, the metadata of executable files while ignoring the content and existence of all other files which would be irrelevant in this search scenario. This process significantly reduces the amount of information which needs to be considered as part of the search, which means searches can be undertaken quickly and efficiently.

The results of these searches can trigger an action or series of actions, such as sending an alert, copying the data to a specified location, deleting an item, creating a report, sending information to an external database or including the item in an optional index and conducting optical character recognition.

The following example shows how an end-user might programmatically invoke a search through an API tool of the invention using a Ruby script:

```
require"rubygems,
require,tmpdir,
Dir.mktmpdir(,scratch,) do |dir|
  the_case = utilities.case_factory.create(dir,:name =>,test case')
  processor = the_case.processor
  folder = processor.new_evidence_container(,Evidence 1')
  text_file = File.join(dir, "test.txt")
  File.open(text_file, 'w,) { |io| io.puts("This is a simple file for testing.") }
  folder. add_file(textJile)
  folder.save
  processor.when_item_processed do |callback|
    puts"Found item: #{callback.path} type: #{callbaclc.mime_type}"
    puts"Map: #{callbaclc.properties}"
    puts"Text: #{callback.text}"
  end
  processor.processing_settings = { :enable_custom_processing => ["properties","text","binary"] }
  processor.process
  the_case.close
end
```

The invention provides the following benefits and advantages.

1. Users can undertake advanced searches without needing to create a complex index that has significant technical and financial overheads associated with its creation. Indices can require storage of between 20% and 200% of the original data set. As organizations handle larger volumes of data and ask increasingly complex questions of that data, traditional methods for indexing data to make it searchable would create indices that would, by necessity, grow extremely large to the point of being technically unmanageable. They would require very expensive quantities of disk storage, processing capability and datacenter rack space. Indeed, these hardware logistics are often the reason why organizations do not undertake many search-related activities such as document classification. However, by searching information while it is held in short-term memory and using heuristics to implement any resulting activity, the Parallelized Custom Data-Processing and Search API negates the need to create an index and its associated requirements for indexing hardware and storage.

2. Many organizations have implemented complex database structures that enable their products and services to work. The Parallelized Custom Data-Processing and Search API enables users to apply the Nuix Engine's rapid searching technology within their existing database structures and schemas.

3. Scanning technologies must by necessity include or exclude the content of compound files in their entirety; they must either handle the compound file as a single item or expand all its component items to disk and scan them individually. This results in massive over- or under-inclusion of results. Nuix's Parallelized Custom Data Processing and Search API opens compound files and applies heuristics to decide whether or not to search each individual item or component while it is in temporary memory/storage. This delivers very specific answers with exact outputs based on search criteria. Thus the invention provides novel features that include methods for opening the container file into the computer's short-term memory; extracting its individual components and—if required—their sub-components recursively until all individual components have been extracted into the computer's short-term memory/storage; conducting simple and sophisticated searches on the data; taking user-defined actions based on the results of those searches; and dis-regarding the non-relevant data. The invention provides the ability to process and search unstructured data independently of an index database format and to extract data from and insert data into other databases as well as the ability to search the content of data, including within complex compound files, without creating an index. Potential uses for systems and methods of the invention include:

1. Privacy: Examining stored data to find individual items which contain indications of private financial, health and personal details.

2. Records Management: Examining stored data and comparing each item with known schemas in order to classify them according to their content and then move them or copy them to the appropriate locations for that particular type of document 3. Cybersecurity threat detection: Examining stored data to find file types which can be used in cyber breaches. These file types include executable and .dll files which may be attached to emails or already have moved themselves to file shares or servers. The parallelized custom data search could identify the executable by its digital signature, perform a series of analyses to identity if it is a threat or not and then escalate and contain items identified as malware.

4. Cybersecurity incident response: Examining stored data on disk and particularly in emails for URLs. Comparing those URLs with known bad phishing or malware URLs and escalating and containing the potential breach 5. Freedom of information requests: Examining stored data and finding information filtered by author, date range and keywords. Once this automatic filtering has been completed in temporary memory/storage, disregarding negative results while indexing positive results for future interrogation and production/display.

Systems and methods of the invention allow processing to be performed by parallel processes or parallel threads. Threads and processes have some similarities and differences. A thread is the smallest sequence of programmed instructions that can be managed independently by an operating system scheduler. Often a thread is a component of a process. Multiple threads can share resources such as memory. The threads of a process share the process's instructions. A process is an instance of the execution of instructions from a computer program. A process may be made up of multiple threads of execution that execute instructions concurrently. Processes are generally independent of each other, whereas threads often exist as subsets of a process. Threads within a process typically share process state, memory, and other resources. Processes interact only through inter-process communication mechanism.

Figure 1:
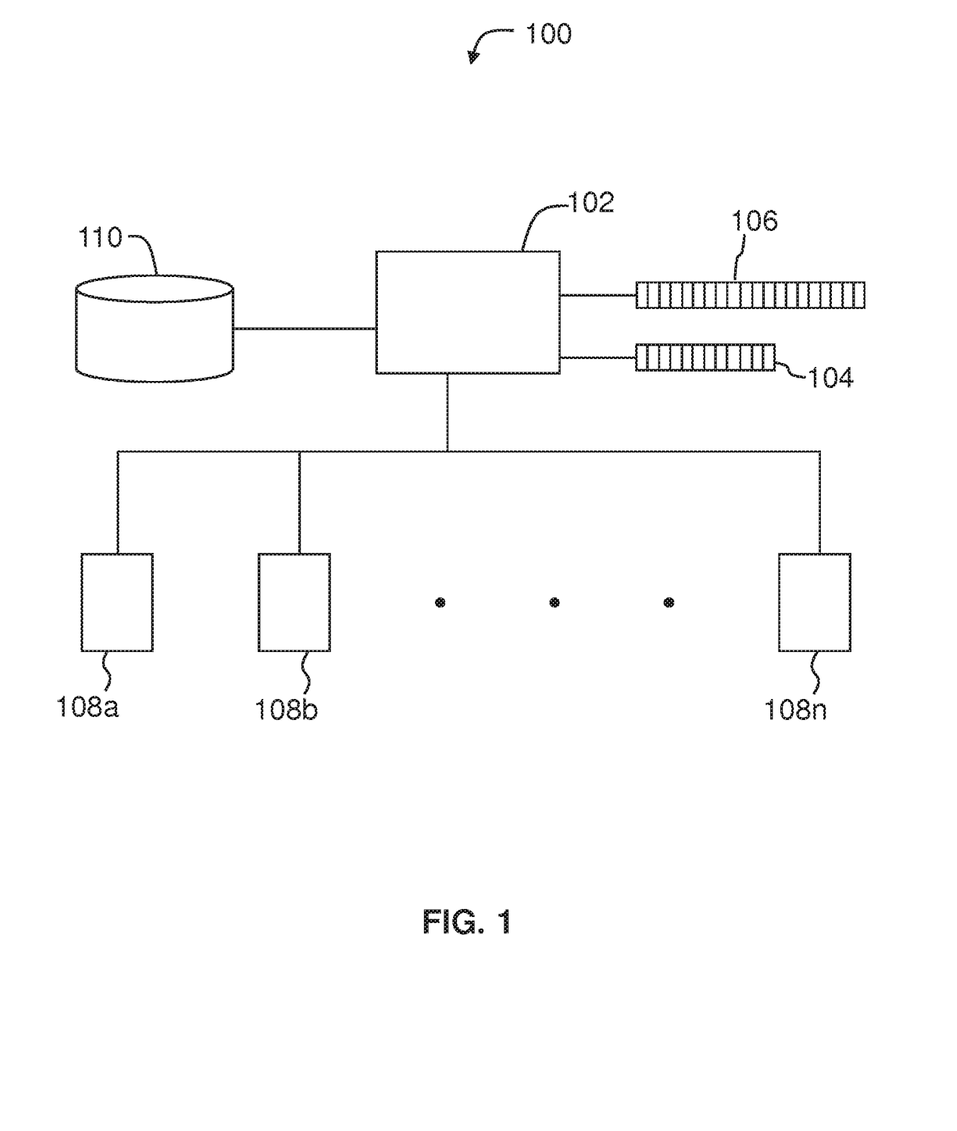
FIG. 1 shows a system for document processing.

FIG. 1 shows a data processing system 100 for parallelizing document processing. Data processing system 100 includes a control computer 102, a job queue 104, a work item queue 106, a process 108, and memory 110. Data processing system 100 includes a messaging module (not show in FIG. 3). System 100 operates via one or more processes 108. For example, data processing system 100 may include one control computer 102 and twenty processes 108a, 108b, . . . 108t. In an embodiment, data processing system 100 may be provided utilizing common off-the-shelf hardware.

Each cloud process 108 may be provided by a server (not shown). Any server may be a multi-processor or multi-core device and may be provided by a virtual machine. Control computer 102 may be a standalone laptop or desktop, or may itself use a server via a terminal to provide keyboard and mouse. Volatile memory 110 may be provided by the memory of control computer 102 or may be a separate volatile memory. Generally, each computer (control computer 102 or server) will include at least one physical processor (i.e., "chip") operably coupled to at least one non-transitory memory device. Any suitable computer device or combination of computer devices may encompass the functionality as illustrated herein. For example, each server may be provided by a cloud computing service, and the physical machine that provides any given server may be, for example, a rack-mounted server device such as the computer sold under the trademark BLADE by Hitachi Data Systems (Santa Clara, Calif.).

Figure 2:
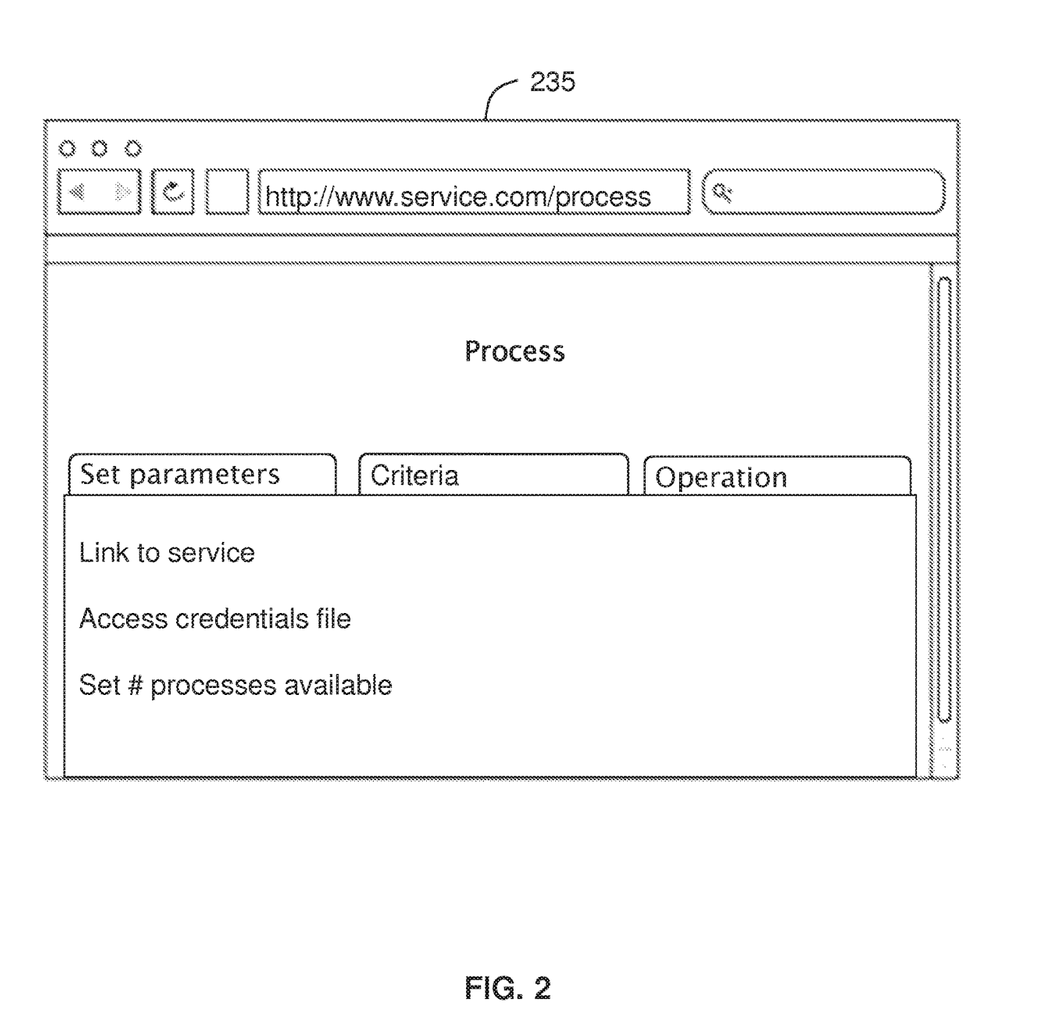
FIG. 2 depicts an interface for controlling data processing.

FIG. 2 depicts an exemplary interface 235 for initiating a data processing project via systems and methods of the invention. In the depicted embodiment, a web-based interface is provided and a user can use a web page in a web browser program to set job parameters, monitor job progress, or obtain a view of results from the data processing.

Setting the parameters allows the user to influence how data processing will proceed. For example, the user can set a link connecting the appropriate target containers, files, archives, disks, etc., and the processors described herein. The user can access a credentials file (e.g., by uploading a password file that has been provided by a sys admin, or by connecting to a master file of account keys, or other similar methods), allowing the system to use processes to process data in the target containers, files, archives, disks, etc. Interface 235 can also be used to control parameters of the job relating to a number of processes that will be employed in a parallelized embodiments.

In some aspects, the invention provides a method comprising opening an archive file into a volatile memory; extracting, using a first process, a first computer file from the archive file without indexing the entire archive file; determining, using the first process, that the first computer file has a second computer file stored therein; causing, using the first process, a second process to extract the second computer file; extracting, using the second process, the second computer file; determining, using the second process, that the second computer file satisfies a criterion; and performing an operation on the second computer file.

In other aspects, the invention provides a method comprising opening an archive file into a volatile memory; extracting, using a first thread, a first computer file from the archive file without indexing the entire archive file; determining, using the first thread, that the first computer file has a second computer file stored therein; causing, using the first thread, a second thread to extract the second computer file; extracting, using the second thread, the second computer file; determining, using the second thread, that the second computer file satisfies a criterion; and performing an operation on the second computer file.

Figure 3:
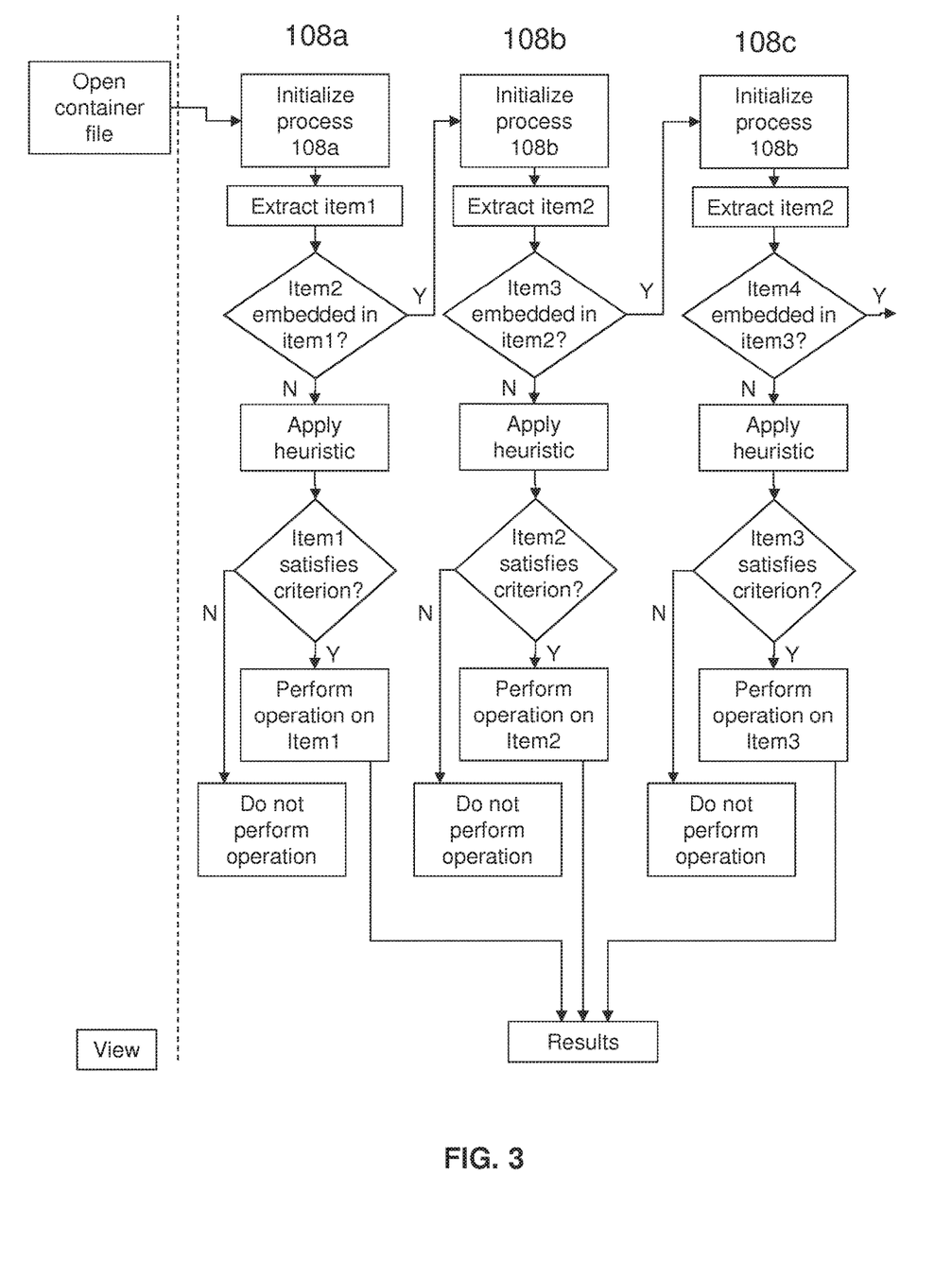
FIG. 3 illustrates the parallel processing framework.

FIG. 3 illustrates the parallel processing framework that can be employed with the invention. The parallel processors engage in load balancing when a data item is being processed. Once the API is started, a process 108 is initiated and gets an item1 to analyze. Process 108a determines if item1 has an item2 embedded within it. If so, process 108*a* triggers process 108*b* to initialize. Process 108*b* then extracts item2.

The API can apply a heuristic rule to determine whether to analyze all data or to treat the data contents as the same. This determination may be based on a size or complexity of the item, or the size or complexity of item2 in view of the size or complexity of item1 a job schedule, other data, user-defined parameters, or a combination thereof. If process 108*a* determines item1 does not satisfy a criterion, it chooses not to perform an operation on item1. If item1 does satisfy the criterion, process 108*a* performs the operation and produces a result.

Process 108*b* determines if item2 has an item3 embedded within it. If so, process 108*b* initializes process 108*c*, which extracts item3. The API can apply a heuristic rule to determine whether to analyze all data or to treat the data contents as the same. This determination may be based on a size or complexity of the item, or the size or complexity of item3 in view of the size or complexity of item 1 a job schedule, other data, user-defined parameters, or a combination thereof. If process 108*b* determines item2 does not satisfy a criterion, it chooses not to perform an operation on item2. If item 1 does satisfy the criterion, process 108*b* performs the operation and produces a result.

Process 108*c* determines if item3 has an item4 embedded within it. If so, process 108*c* initializes process 108*d* (not shown), which extracts item4. The API can apply a heuristic rule to determine whether to analyze all data or to treat the data contents as the same. This determination may be based on a size or complexity of the item, or the size or complexity of item4 in view of the size or complexity of item3 a job schedule, other data, user-defined parameters, or a combination thereof. If process 108*c* determines item3 does not satisfy a criterion, it chooses not to perform an operation on item3. If item1 does satisfy the criterion, process 108*c* performs the operation and produces a result. One of skill in the art will appreciate that the described process is recursive and may include any suitable number of processors.

This load balancing methodology provides speed and scalability. This creates the availability of advanced search functionality. This also supports an easy costing model. The processing is notable for working entirely where the client's data is. The client's data can be processed using cloud resources and the client need not purchase and maintain expensive new hardware to process its data.

The operation performed by the process 108 can be predefined by a user. Because the operation is defined by the user, the invention is highly customizable for different business purposes. The action can be a simple or sophisticated search, or it can be some other means of manipulating data such as moving a file, extracting certain data, saving a file, deleting a file, and the like.

Efficiency and throughput is achieved by having individual processes 108 participate in load-balancing methodologies disclosed herein whereby an individual process 108 acts as a master and initiates instances of other individual processes 108 searching items in a volatile memory as those items are discovered embedded within data items. The front end interface (e.g., as exemplified in FIG. 2 or other versions) can be provided using HTML and JAVA or other programming methodologies. The interface 435 and control over operations can be developed in an environment such as .Net (e.g., C#) or Groovy and Grails. As needed for implementing modules or functionality herein, a scripting language such as Ruby scripting may be employed. Data results and data structures may be collected and stored using SQL Based Technologies. In general, control computer 102 may be a mac, Windows, or Linux based computer or any other computing device capable of displaying interface 435. As discussed above, the system 401 employs load-balancing logistics, wherein an individual process 108 may make a decision to search or not to search items discovered within items and pass those items off to another process 108 that itself makes a decision. This load balancing is recursive according to the nature of the data being processed.

The invention provides the ability to process data from a multitude of cloud sources. The invention makes use of the parallel processing framework and worker mapping to simulate many (e.g., hundreds) of user sessions to overcome systematic bandwidth throttling performed by online email service providers. Systems and methods of the invention can be used for forensic and corporate based investigations, e-Discovery and regulatory disputes or investigations; as well as criminal and civil legal matter investigations. Additionally, the invention provides valuable tools for information governance, and can be used in the monitoring, migration, or culling of data. (As noted in the examples, previously "un-found" data and emails can be found; also, duplicate records can be identified.) System and methods of the invention support litigation readiness and aid in the identification of company records. The invention may be used for the identification of Privacy information including Personally Identifiable Information (PII), PCI (Credit Card information) and PHI (Personal Health Information) which is stored in non-secure environments. These resources and tools will allow organizations to save money on eDiscovery and investigation and, ultimately, threats will be detected quicker.

As discussed above, the invention provides methods of processing data items. The methods can include filtering data items. Filtering can be done by custodian, kind (i.e., whether as loose files and document, emails, attachment or by individual format type), email types (e.g., .msg, eml, .nsf), calendar item, contact, document type (e.g., .pdf, .ps, .pub, .doc, .xml, .xps), spread sheet types (e.g., .xls, .ods, .xlsb, .xlsx), presentation types, the presence or types of drawings or multi-media files, databases or containers as discussed below, the lack of data items, unrecognized files, or irregular items (e.g., corrupted containers, non-searchable PDFs, bad extensions, unrecognized, unsupported, empty, encrypted, decrypted, deleted, corrupted, text stripped etc.). Other types of actions that may be used are sorting, filtering, or categorizing including on comments already made about the individual items, skin tone analysis for images (severe, high, medium, low), identification of languages (i.e. all of them), hash matching etc.

Embodiments of the invention include recognizing a priority of identification of important information. For example, using techniques such as regular expressions or pattern matching, certain types of information can be flagged for priority treatment. Such types of priority information can include credit card numbers, social security numbers, currencies and amounts, geographical locations, IP addresses, email addresses, physical addresses, company names, ticker symbols, and others.

The invention provides for a variety of types of, and strategies for, searching. An illustrative list of searches include: searches text content only; searches on the name of the item; searches on the MIME type of the item; searches for the short ID that is unique for this case; searches for items of the same size; searches for audited items of the same size; searches over the property names and values associated with every item of data; searches over the whole number properties associated with every item of data;

searches over the fractional number properties associated with every item of data; searches over the date properties associated with every item of data; searches over item contents but returns the associated top-level item for any hits; searches over item names but returns the associated top-level item for any hits; searches over the property names and values associated with every item of data, but returns the associated top-level item for any hits; searches over the name, content, property names and values associated with every item of data, but returns the associated top-level item for any hits; searches for an item by the date of the item (the date of the item will generally be the same as the communication date for items which represent a communication and the modified date for other types of item, items without a date inherit the date of their parent); searches for characters from particular writing systems; searches on the digests of data items; searches over custom evidence metadata which the investigator attached when choosing the evidence data to load; searches over the file extensions detected over all items; and searches on whether items have or do not have binary data. Systems and methods of the invention can be used to perform a variety of tests such as, for example: tests if this item type may contain text data; tests if this item has image data; tests if this item has communication data; and tests if this item has embedded data. The invention may be used to identify items that satisfy certain matching criteria such as, for example: exact duplicates; matches items where one of the ancestors of the item has the provided name; matches items where one of the ancestors of the item contains the specified kind of data (similar to using the path-mime-type field, but simpler to use); matches items where one of the ancestors of the item has the provided MIME type; matches items which have been encrypted; matches items which contain the specified characters; matches items that contain text in specified languages; and others. Results from a processing operation of the method can be exported to all major review platforms, including proprietary review platforms, in all formats (i.e. native, PDF, Tiff, text and Nuix subcases).

Central to the robust and rapid processing provided by the invention is the operation of processes (e.g., as described in FIG. 3) to process data. The term "data" shall refer to any collection of numbers, characters, images, instructions, or other forms of information in an electronic format. Examples of data may include, but are not limited to, an exchangeable database file, a disk image file, electronic documents, electronic mail messages, PST files, an electronic document embedded within another file, and a directory containing millions of office documents.

Systems are operable to process data from a single file (i.e. a word doc or email) or to re-assemble data from multiple files to form a copy of the original single data item. This is useful when the storage/imaging systems stores different parts of a file in different places (which sometimes happens). Some examples:

Disk images—items are often segmented/spread across multiple disk blocks.

EDB/STM files—often the email's data record refers to ("points to") an associated record, e.g., RFC822 text in an STM ("stream") file (i.e. needing to merge two or more data files to create a copy of the original).

Additionally, systems and methods of the invention are provided for complex processing. For example, some structures such as Symantec Vault/EMC email Extender (i.e. big archives) involve databases such as Microsoft SQL Server which point to the location of components of the data. System and methods of the invention can read the database records to discern the locations of those components, find the components, and re-assemble the data streams into the original items (e.g., making a new copy of an archived email). An extension of this problem comes up when an archive (e.g., Symantec's Vault) uses single instance imaging (i.e. where just one copy of an email or attachment is kept rather than many for storage optimization). The database keeps track of where the original attachment, email body, other component(s), or a combination thereof is located, and systems and methods of the invention—by including the database in the process—re-assembles the data appropriately by inspecting the item's record(s) in the database. Thus, systems and methods of the invention are operable to contact a database within an archive system, wherein the database indicates locations of components of archived items. Moreover, systems and methods of the invention are operable to process those items even where data is stored via single instance imaging.

In certain embodiments, systems and methods of the invention operate at one of multiple different levels. A level may refer to complexity or data level of a job and may particularly relate to levels of embedding, selection of certain contents or metadata, or a combination thereof. For example, multiple user-defined processing criteria may be used and a processing system can be set to operate to return the results of a selected criterion. To illustrate, the API could return results of a search job performed down to the metadata level of all the documents and attachments including an MD5 fingerprint, whereas full-text processing relates to indexing metadata and all the text of all the documents held across an entire storage system (e.g., within all the archives, file shares, DMSs etc. in a SAN, on a storage volume in the cloud).

In certain embodiments, systems and methods of the invention provide a data processing system and method to thoroughly process vast quantities of unstructured data within a reasonable time. The invention includes the insight that data repositories hold massive volumes of unstructured "dark data" in a variety of formats and storage systems. As a rough approximation for a general description, levels of complexity in data storage could be described, from simplest to more complex, as: (i) text or html; (ii) document; (iii) containers; (iv) complex containers; (v) massive, complex containers; and (vi) compliance storage systems. Text and HTML can include, for example, log files, web pages, or social networking posts such as posts on the web site Twitter.

Documents may contain text or HTML, metadata, formatting and embedded content. The common formats include word processing documents, spreadsheets, and presentations.

Containers can be structures of varying complexity designed to embed large numbers of items, with accompanying metadata. Unlike the present invention, existing indexing and scanning engines don't often extract content embedded within these files or don't deal well with the complexities of the formats. Examples of containers include folders, compressed (e.g., zip, tar) files, disk images, and single-user email databases such as PST, OST, NSF and mbox files.

Complex containers, which may be, for example, multiple-user email databases, contain even deeper levels of embedding and more complex metadata. They can reach many terabytes in size and contain millions of embedded items. Examples of complex containers include databases from the mail server sold under the trademark EXCHANGE by Microsoft Corporation (Redmond, Wash.), the business application platform sold under the trademark LOTUS DOMINO by IBM Corporation (Armonk, N.Y.), and the software platform sold under the trademark GROUPWISE by Novell, Inc. (Provo, Utah), as well as large file systems that contain embedded containers and other complex containers.

Massive, complex containers include enterprise-scale systems that wrap proprietary containers around each file or email message they store. These systems are so complex they require database lookups to locate text, metadata and attachments, which are typically stored separately. While they provide native searching capabilities, these are almost never designed with the needs of electronic discovery, investigation or information governance in mind. Examples of massive, complex containers include email archives, content management systems, or items from content management platforms such as the platform sold under the trademark SHAREPOINT by Microsoft Corporation (Redmond, Wash.) or Symantec Vault by Symantec Corporation (Mountain View, Calif.).

Compliance storage systems can include, for example, "write once, read many" (WORM) storage repositories that obfuscate content by adding additional layers of proprietary wrappers around the data stored in them. Many organizations that face retention regulations have invested in compliance storage systems to ensure data, once stored, cannot be tampered with. Generally, since data stored in these systems cannot be deleted, organizations looking to remove redundant, outdated or trivial data must instead identify the valuable data and migrate it to a new platform enabling them to then turn off the legacy system Examples of compliance storage systems include the content-addressable storage (CAS) platform sold under the trademark CENTERA by EMC Corporation (Hopkinton, Mass.) or the non-erasable compliance storage software sold under the trademark SNAPLOCK COMPLIANCE by NetApp (Sunnyvale, Calif.).

Systems and methods of the invention are operable to provide various service methodologies including, for example, deleting data that has no business value; identifying and preventing potential privacy breaches; locating and automatically classifying company records; intelligently migrating important data to lower-cost or more flexible repositories (e.g., cloud storage) identifying computer viruses that are spreading, creating cyber security issues and vulnerabilities; or proactively mining data for valuable information. Any processing operation can be accompanied by copy, show, delete, delete "all but", or similar operations for results that match search one or more search criterion. Search criteria can include testing for certain values in metadata (e.g., created or modified on, before, after, or within a certain date or date range; created or modified by a certain user, having certain read, write, execute permissions; containing certain content types such as picture files or videos; etc.). Additionally, matching criteria for electronic items being processed can be specified through the use of regular expressions, which can be applied to document contents, embedded data, or a combination thereof. For example, all electronic items accessed by user John Smith that contain a character string matching/(S|s)ell [0-9]{0-4} shares. *([A-Z]{2-3})/ can be operated on (e.g., copied to a new storage device). Moreover, in the previous example, all instances of matches can be processed by the $2 value returned by the pattern matching, thereby processing sell orders by ticker symbol and copying all records of those sell orders to a separate disk drive. This example is given for illustration and is not limiting. For example, a delete "all but" operation can be used on a copy of an archive to create a version that is includes only emails sent by a certain user.

The invention provides systems and methods for load-balancing, fault tolerance, and intelligent processing.

Fault tolerance according to the invention ensures that the system processes all tasks that are fed into it. Some tasks, such as corrupt files, can cause a process to crash. Some tasks just fail for no obvious reason. If a task fails, it will roll back to a stable state and restart. If a task fails multiple times, it can be marked as unreadable. If the system encounters corrupt or unreadable files, it simply picks up where it left off. Every electronic item in an archive is processed in detail, or it is treated based on a heuristic rule, or it is marked as unreadable (e.g., for physically corrupt or absent material). Systems and methods of the invention recovery seamlessly whenever an individual process 108 fails, without losing data.

Intelligent processing can include multiple queues. For example, a system may process data as it is received or and employ one or more internal work queues. In some embodiments, control computer 102 maintains a job queue and a work item queue. The job queue contains items delivered from a file system—these may be individual loose files; complex files with embedded components, such as zip files; or even entire email databases or forensic images. The work item queue contains individual items that a single process can manage, such as an email message or a Word document.

Systems and methods of the invention provide secondary processes 108 that can make intelligent decisions about each task they receive. If it is an individual item, they process it directly. If it contains multiple individual items, the process 108 can break the file into its components and initiate another process to analyze a component. Each process 108 makes this decision based on a number of heuristics. If the process determines based on pre-defined parameters that a blanket rule can be applied to all the data in a file, then the process can apply that rule and move on. If it determines however that the data must be further analyzed, it can send an individual component to another process to analyze that data. The load-balancing cloud processes 108 provide an additional benefit of more comprehensive and thorough processing than prior art systems. In systems and methods of the inventions, the cloud processes 108 are operable to detect where an item to be processed is associated with embedded data and to create a new work item for the embedded data, causing a second process 108 to analyze the embedded data. If the embedded data (ED1) has data embedded within it (ED2, i.e., ED2 is embedded data within embedded data ED1), the second process 108 will discover the ED2 embedded data and create new work item for that (ED2). This process is fully recursive.

To illustrate, a business enterprise may be using an archive file. One electronic item within that archive may be a disk image of a hard drive from a retired email server. The disk image may contain an email database in which messages are broken up into components. One entry in the email database may be an email message that had an attachment (the attachment, the other components of the email, and the database entry may all be on separate datacenters within the cloud), and the attachment may, itself, be an email message. The email message that was an attachment may not be an entry in the email database. The email message that was an attachment may itself further have an attachment. The attachment embedded in the email message that was an attachment may be a presentation file from a presentation program such as the one sold under the trademark POWERPOINT by Microsoft Corporation (Redmond, Wash.).

Slides within the presentation file may include jpeg files that were inserted. One jpeg file within the presentation file may include a hidden embedded watermark identifying a copyright owner of the jpeg picture content.

In this example, there are several levels of embedded data, as follows: cloud>archive>disk image>email database>email 1 entry in database>email 2 attached to email 1>presentation file attached to email 2>jpeg file in presentation file>digital watermark in jpeg file. Some prior art systems would have analyzed only to some arbitrary depth of this recursive structure, having no mechanism for plucking an electronic item from within the structure and treating it as having equal status as any other item from within the structure while also remembering the proper location of the item from within the recursive structure. Systems and methods of the invention are operable to determine the presence of each instance of embedded data and create an associated work item, with all work items being co-equal.

As applied to the just-described example, the processing job will not end with the top-level content of the email database (i.e., discovering only email 1). Systems and methods of the invention will go on to discover email 2 as well as the presentation file attached to email 2. As a result, a processing job performed using systems and methods of the invention will show that email 2 went from its sender to its recipient with the presentation file attached and further that the presentation had the specifically digitally-watermarked jpeg file therein. By such a mechanism, systems and methods of the invention may uncover numerous electronic items that prior art systems do not find.

These capabilities ensure that the system extracts the maximum performance from server hardware when processing all kinds of unstructured data.

In addition to its massive parallel processing capabilities, systems and methods of the invention provide tools for accessing information in, and understanding, complex file and storage types such as email databases and archives, forensic images and WORM storage. This makes it possible for the system to process all layers of unstructured data—in situ and behind the firewall and in-site in the cloud—cracking open the formats of the largest and most complex storage containers to extract the content inside them.

Without this capability, traditional indexing and scanning systems are restricted to looking for loose text or extracting data through application programming interfaces, which are slow and can only supply a limited amount of data and metadata. This means the system finds data that other systems miss.

Systems and methods of the invention delivers near-linear scalability in multi-socket servers with multi-core processors. Systems and methods of the invention use a deep understanding of files, file-structures and text and metadata extraction to provide high-quality processing.

In certain embodiments, the processing system includes a hypervisor or similar product that creates a plurality of virtual machines. The hypervisor can allocate processing power to each virtual machine as-needed or under the control of an administrator. Since the hypervisor can allocate resources as-needed to the virtual machine and re-capture the capacity of idle resources, processing projects can be accomplished with less time across numerous dedicated machines and particularly with less idle time of dedicated hardware. Any suitable virtual machine product may perform the role of hypervisor. The system creates a desired number of virtual machines in which guest software executes as if it were running directly on physical hardware.

The described architecture provides a number of benefits. The system operates at significantly lower energy consumption, resources are used more efficiently in terms of providing results rapidly, and subsystems can be more easily maintained, inspected, updated, and protected that with dedicated hardware embodiments.

In certain embodiments, one or more of the virtual machines each allow a guest OS (e.g., each one designed for the same instruction set) to be run in isolation. This may be allowed by including such tools as, for example, Parallels Workstation, Parallels Desktop for Mac, VirtualBox, Virtual Iron, Oracle VM, Virtual PC, Virtual Server, Hyper-V, VMware Workstation, VMware Server (formerly GSX Server), KVM, QEMU, Adeos, Mac-on-Linux, Win4BSD, Win4Lin Pro, and Egenera vBlade technology, Linux KVM, VMware Workstation, VMware Fusion, Microsoft Hyper-V, Microsoft Virtual PC, Xen, Parallels Desktop for Mac, Oracle VM Server for SPARC, VirtualBox and Parallels Workstation. The hypervisor may be provided by any suitable manager such as, for example, the NVIDIA VGX Hypervisor, which allows a virtual machine to interact directly with a processor. The hypervisor manages resources to allow multiple processing sub-systems to share common hardware. Each virtual machine can provide a guest operating system or processing environment. The guest OS can provide applications, drivers, APIs, and remote protocol tools. Virtualization and data processing are discussed in U.S. Pat. Nos. 8,239,938; 7,672,790; 7,743,189; U.S. Pub. 2011/0274329; U.S. Pub. 2008/0143707; and U.S. Pub. 2004/0111552, the contents of each of which are incorporated by reference. Components may be onsite or off-site relative to one another or to the computer systems to be processed. Components can be connected by network resources, which can include the Internet, a WAN or LAN, cellular telephone data networks, other methodology, or a combination thereof. It has been found that operating systems in a virtualized environment with up to 12 physical cores provides particularly useful results. In fact, the more cores the better as the data becomes more complex.

The messaging module of data processing system 100 may be any means for communication between the components of data processing system 100. For example, the messaging module may be a Java Messaging Service (JMS) Application Programming Interface (API) utilized over a gigabit Ethernet. In an embodiment of the present disclosure, the message module is Apache ActiveMQ. In another embodiment, the messaging module utilizes TCP/IP sockets and MPI or PVM messaging libraries. Enterprise messaging systems, which provide additional facilities such as persistent messaging and message queues, may also be adapted as the messaging module. The message processing module further utilizes a messaging processing module to process status messages.

In an embodiment of the present disclosure, data processing system 100 implements a parallel processing architecture in which a large collection of data requires processing and each set of data contains an unpredictable amount of processing requirements. In this architecture, control computer 102 receives a list of data which is held in volatile memory 110. Control computer 102 stores the list of data in local memory utilizing job queue 104 and work item queue 106. In an embodiment, a separate data storage medium, such as a disk-based storage drive, may be used if the entries of work item queue 106 are too large to store in the local memory. Preferably, the list of data is stored in a tangible, non-transitory medium (e.g., one or more of a hard disk drive, solid state drive (SSD), an optical disc, flash memory, zip disk, tape drive, "cloud" storage location, or a combination thereof). It is noted that, pre-processing, these data typically represent and point to the unstructured work product of a business enterprise (e.g., the communications, contracts, documents of title, incorporation papers, work product, intellectual property, and other materials possessed by an entity).

Control computer 102 creates work items based upon the list of data. A work item in data processing system 100 specifies an item of data that needs to be processed. For example, the item of data within a work item may be an exchange database file (EDB) file, a disk image file, an email message inside a Microsoft Outlook PST file, a Microsoft Word document, a zip file, an email message, and a Lotus Notes database file.

In an embodiment, a work item may be comprised of the physical location of the data stored in volatile memory 110, at least one data identifier to distinguish the location of embedded data associated to the data, and an identifier associated with the data. The identifier associated with the data may be a globally unique ID of the processing job that the work item is a member of. The physical location of the data may be represented by a root URL such as a file path to a PST file ("c:\evidence\input.pst"). The at least one data identifier may be an array of embedded IDs leading to the actual embedded data item inside the top-level data item. The actual values chosen for embedded IDs is implementation-dependent, but a simple implementation could be the embedded child ID based on position. For example, to describe a work item of the second attachment in the seventh email, inside the fourth folder, and inside a PST file, the at least one data identifier would be (assuming indices start at 0): {"3", "6", "1"}.

Control computer 102 monitors and tracks work items which need to be processed by process 108. Each process 108 can ask control computer 102 for a new work item to process whenever it is idle. In an embodiment, each process 108 executes four separate processes for requesting and processing work items. Once process 108 has finished processing a work item, process 108 may ask control computer 102 for another work item. In another embodiment, control computer 102 provides work items in a batch, for example, ten work items at once, to each process 108 to remove messaging latency. Since each process 108 controls work allocation explicitly, this architecture automatically provides load-balancing.

For the purposes of load-balancing, it is inefficient for process 108 to process an entire exchangeable database file, while another process 108 processes a single electronic file. In an embodiment, process 108 determines characteristics of embedded data within a work item. Process 108 may process the work item based upon the type of embedded data, such as an exchangeable database file, a Microsoft Outlook email file, a Lotus Notes database file, a mailbox message file, an Outlook Express mail file, an Encase disk image file, raw disk image files, and partitions within a disk image. Process 108 may also, for example, utilize the following classifications to determine the appropriate means to process embedded data:

INLINE: indicates a relatively simple embedded data (for example a word processing document) that should be processed immediately without any additional communication to control computer 102.

WORK ITEM: indicates that the embedded data is sufficiently complex that it should be processed by another process 108. The embedded data is sent to control computer 102 to provide to another cloud process 108 to process this embedded data.

PROCESSING_JOB: indicates that it is very complex data which control computer 102 needs to handle as a separate processing job.

As process 108 processes a data item, which may contain embedded data therein, process 108 may send a status message to control computer 102 to indicate that the embedded data should be processed by another process 108. Upon processing each job and work item within job queue 104 and work item queue 106, control computer 102 may signal each process 108 and any intermediate results created by each process 108 can be passed to control computer 102 for final aggregation.

Data processing system 100 may include a fault tolerance mechanism. A fault tolerance mechanism may be provided on control computer 102 and each process 108 to ensure that an entire process does not need to be restarted from the beginning in the event of a software or hardware failure.

In an embodiment, a failure tolerance mechanism is provided on at least one process 108. If process 108 has a software or hardware failure, a fault tolerance mechanism can allow process 108 to restart its processes and continue to receive status messages from control computer 102. The fault tolerance mechanism may be implemented to allow the messaging module to recognize when process 108 has restarted, and if necessary, re-deliver any outstanding status messages to process 108 (or re-route them to other processes 108).

A fault tolerance mechanism may also be provided on control computer 102. If control computer 102 has a software or hardware failure, a fault tolerance mechanism can allow control computer 102 to restart its processes and continue to provide status messages to process 108. In an embodiment, each process 108 is restarted upon the failure of control computer 102, and the pending work items in work item queue 106 are serialized to ensure that remaining jobs in job queue 104 are processed upon restarting control computer 102.

As shown in FIG. 3, the invention provides methods for processing data. A target such as any container or archive file is opened into volatile memory. A first process is started and the first process extracts a file from the target. This can be performed without creating an index. It is not necessary to index the target. The first process determines whether the file includes a second file (e.g., embedded or stored within the file. If the file includes a second file, a second process is started and the second process extracts the second file.

Figure 4:
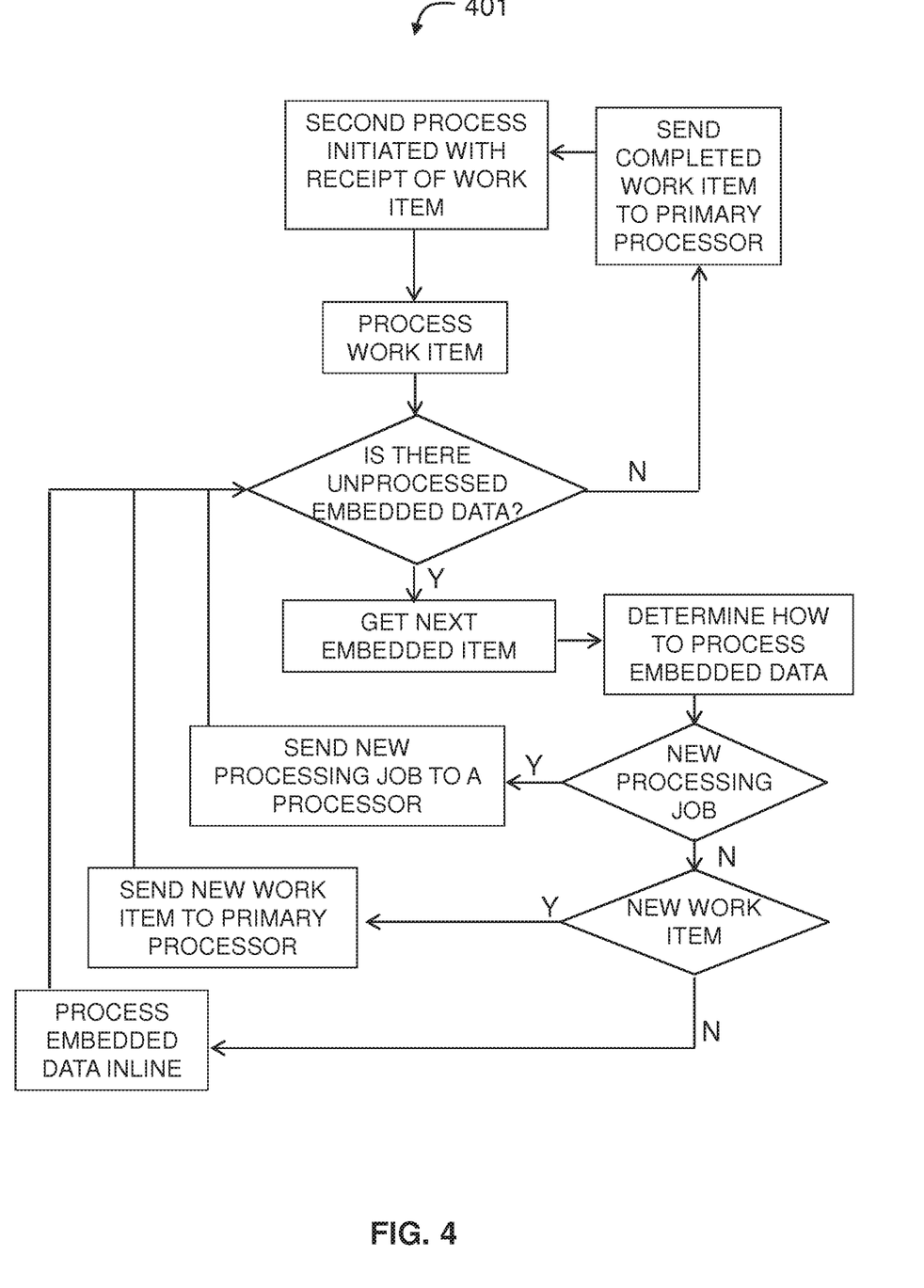
FIG. 4 illustrates a logic that may be followed by a load-balancing process.

Methods of the invention may be used to perform any suitable operation on target data such as searching, monitoring, archiving, or others. For example, method 401 can include applying some criterion to data such as determining if certain keywords are included or if certain file types, file sizes, or creation dates are found. One benefit of methods of the invention is the ability to perform certain operations on the data being processed. For example, data that matches the criterion (or criteria) can be copied, deleted, backed-up, password protected, translated, or subject to any other such operation. As shown in FIG. 4, one of the processes such as the second process can perform the operation on the file that the process is processing.

As just described in method 401, if a first processor processes a file and discovers an embedded second file, a second process extracts the second file and processes it. This methodology may be iterative in that the second processor, upon discovering a third file embedded in the second file, can cause a third process to start. The third process can then process the third file. However, this gives but one non-limiting illustrative example.

In certain embodiments, any one or more of the various processes can make a more nuanced decision than just described. Each process can—upon discovering an item embedded within the item being examined—make a determination of whether to process the newly-discovered embedded item inline versus calling a new process to examine the newly-discovered embedded item. In essence, the process can operate according to instructions that say "this will just take a minute; I'll do it myself" or "this is a big job; I'll call for backup."

FIG. 4 illustrates a logic that may be followed by a second process in certain embodiments of the invention. A primary processor/first process uses a messaging module to call a second process and the decision logic for the second process begins upon receiving a message or work item from the first process. The second process processes the work item as set forth in the status message. The actual work item described in the status message is interpreted by the second process to ensure that it is clear which data needs to be processed. For example, the data could be email number 56 in an archive file.

The second process determines if the data of the work item contains embedded data. For example, embedded data may be an electronic mail which contains attachments, or a Microsoft PST folder which contains an email message. If the second process determines that the work item contains embedded data, the second process extracts the embedded data. The second process determines a characteristic of the embedded data. Based upon the characteristic of the embedded data, the second process determines how to process the embedded data. In this illustrated example of processing logic 401, the second process (and by extension, each process) can determine that embedded data will be processed according to one of three options: (i) the embedded data will be sent to a different processor as a new processing job; (ii) the embedded data will be represented as a new work item; or (iii) the second processor will process the embedded data inline as if it were not embedded but imply part of the file. Thus, if the second process determines that the work item contains very complex data, the second process can provide a status message to a control computer 102 to create a new entry within job queue 104 and provide the new work item to another process 108. More commonly, the second process will determine that the embedded data should be handled by another process, and will send it as a processing job to a new process. And alternatively the second process may just do the processing inline (e.g., if the embedded data is small).

Systems and methods of the invention provide for rapid, on-line, background processing of electronic information. This yields significant benefits such as the increased protection of employees, and customers, private information; improved abilities to manage information stores, understand the content of stored items and ensure they are stored in the correct places; improved ability to find files; improved ability to search file content; as well as increased protection of intellectual property from cyber-threats and cyber-espionage.

As used herein, the word "or" means "and or or", sometimes seen or referred to as "and/or", unless indicated otherwise.

INCORPORATION BY REFERENCE

References and citations to other documents, such as patents, patent applications, patent publications, journals, books, papers, web contents, have been made throughout this disclosure. All such documents are hereby incorporated herein by reference in their entirety for all purposes.

EQUIVALENTS

Various modifications of the invention and many further embodiments thereof, in addition to those shown and described herein, will become apparent to those skilled in the art from the full contents of this document, including references to the scientific and patent literature cited herein. The subject matter herein contains important information, exemplification and guidance that can be adapted to the practice of this invention in its various embodiments and equivalents thereof.

What is claimed is:

1. A computer-implemented method for processing data using a computer system, the method comprising:
opening a container file into a volatile memory;
extracting, using a first computer process, a first computer file from the container file without indexing the entire container file and without creating an index;
determining, using the first computer process, that the first computer file has a second computer file stored therein;
causing, using the first computer process, a second computer process to extract the second computer file;
extracting, using the second computer process, the second computer file;
determining, using the second computer process, that the second computer file satisfies a criterion defined by a user; and
indexing the second computer file into an index of files that satisfy the criterion defined by the user, which index comprises less than the entire container file.

2. The computer-implemented method of claim 1, further comprising continually monitoring a target computer to automatically index, in real time, computer files of the container file by running, via a background process on one or more processors, each of the first computer process and the second computer process.

3. The computer-implemented method of claim 1, wherein the computer system is configured to run, via a background process on one or more processors, at least the second process, so as to index, in real time, each such second computer file that satisfies the criterion defined by the user.

4. The computer-implemented method of claim 1, wherein the criterion correlates the second computer file to an eDiscovery search, to produce an index of documents responsive to the eDiscovery search.

5. The computer-implemented method of claim 1, wherein the criterion identifies the second computer file as containing indication of private financial details of an individual or health details of an individual.

6. The computer-implemented method of claim 1, wherein the criterion identifies the second computer file as a cybersecurity threat.

7. The computer-implemented method of claim 1, wherein the criterion identifies the second computer file as malware.

8. The computer-implemented method of claim 1, wherein the criterion correlates the second computer file to a freedom of information request to produce an index of documents responsive to the freedom of information request.

9. The computer-implemented method of claim 1, further comprising repeating the first computer process and the second computer process to index a plurality of computer files from the container file, wherein each file of said plurality of computer files from the container file comprises a second computer file that satisfies the criterion defined by a user.

10. The computer-implemented method of claim 1, further comprising repeating the first computer process and the second computer process to index all computer files from the container file that satisfy the criterion defined by a user.

11. A computer-implemented system for processing data, the system comprising at least one processor coupled to a volatile memory, the at least one processor configured to:
   open a container file into a volatile memory;
   extract, using a first computer process, a first computer file from the container file without indexing the entire container file and without creating an index;
   determine, using the first computer process, that the first computer file has a second computer file stored therein;
   cause, using the first computer process, a second computer process to extract the second computer file;
   extract, using the second computer process, the second computer file;
   determine, using the second computer process, that the second computer file satisfies a criterion defined by a user; and
   index the second computer file into an index of files that satisfy the criterion defined by the user, which index comprises less than the entire container file.

12. The computer-implemented system of claim 11, wherein the at least one processor configured to:
   continually monitor a target computer to automatically index, in real time, computer files of the container file by running, via a background process on one or more processors, each of the first computer process and the second computer process.

13. The computer-implemented system of claim 11, wherein the at least one processor configured to:
   run, via a background process, at least the second process, so as to index, in real time, each such second computer file that satisfies the criterion defined by the user.

14. The computer-implemented system of claim 11, wherein the at least one processor configured to:
   repeat the first computer process and the second computer process to index a plurality of computer files from the container file, wherein each file of said plurality of computer files from the container file comprises a second computer file that satisfies the criterion defined by a user.

15. The computer-implemented system of claim 11, wherein the at least one processor configured to:
   repeat the first computer process and the second computer process to index all computer files from the container file that satisfy the criterion defined by a user.

16. A non-transitory memory device having data stored thereon, the data comprising instructions which, when executed by a processor, cause the processor to perform a process, the process comprising:
   opening a container file into a volatile memory;
   extracting, using a first computer process, a first computer file from the container file without indexing the entire container file and without creating an index;
   determining, using the first computer process, that the first computer file has a second computer file stored therein;
   causing, using the first computer process, a second computer process to extract the second computer file;
   extracting, using the second computer process, the second computer file;
   determining, using the second computer process, that the second computer file satisfies a criterion defined by a user; and
   indexing the second computer file into an index of files that satisfy the criterion defined by the user, which index comprises less than the entire container file.

17. The non-transitory memory device of claim 16, wherein the process further comprises:
   continually monitoring a target computer to automatically index, in real time, computer files of the container file by running, via a background process on one or more processors, each of the first computer process and the second computer process.

18. The non-transitory memory device of claim 16, wherein the process further comprises:
   running, via a background process on one or more processors, at least the second process, so as to index, in real time, each such second computer file that satisfies the criterion defined by the user.

19. The non-transitory memory device of claim 16, wherein the process further comprises:
   repeating the first computer process and the second computer process to index a plurality of computer files from the container file, wherein each file of said plurality of computer files from the container file comprises a second computer file that satisfies the criterion defined by a user.

20. The non-transitory memory device of claim 16, wherein the process further comprises:
   repeating the first computer process and the second computer process to index all computer files from the container file that satisfy the criterion defined by a user.

* * * * *

UNITED STATES PATENT AND TRADEMARK OFFICE
CERTIFICATE OF CORRECTION

| | | |
|---|---|---|
| PATENT NO. | : 11,516,245 B2 | Page 1 of 1 |
| APPLICATION NO. | : 17/076525 | |
| DATED | : November 29, 2022 | |
| INVENTOR(S) | : David Sitsky et al. | |

It is certified that error appears in the above-identified patent and that said Letters Patent is hereby corrected as shown below:

In the Claims

At Column 21, Claim number 12, Line number 31, please add --is-- after "processor"

At Column 21, Claim number 13, Line number 38, please add --is-- after "processor"

At Column 21, Claim number 14, Line number 44, please add --is-- after "processor"

At Column 22, Claim number 15, Line number 2, please add --is-- after "processor"

Signed and Sealed this
Fourteenth Day of March, 2023

Katherine Kelly Vidal
*Director of the United States Patent and Trademark Office*